(12) United States Patent
Lagunar Herranz

(10) Patent No.: US 10,589,645 B2
(45) Date of Patent: Mar. 17, 2020

(54) SECURING DEVICE FOR SECURING OBJECTS IN A VEHICLE

(71) Applicant: Jose Lagunar Herranz, Valladolid (ES)

(72) Inventor: Jose Lagunar Herranz, Valladolid (ES)

( * ) Notice: Subject to any disclaimer, the term of this patent is extended or adjusted under 35 U.S.C. 154(b) by 14 days.

(21) Appl. No.: 15/739,018

(22) PCT Filed: Jun. 24, 2016

(86) PCT No.: PCT/ES2016/070478
§ 371 (c)(1),
(2) Date: Dec. 21, 2017

(87) PCT Pub. No.: WO2016/207469
PCT Pub. Date: Dec. 29, 2016

(65) Prior Publication Data
US 2018/0178683 A1    Jun. 28, 2018

(30) Foreign Application Priority Data
Jun. 24, 2015   (WO) ................ PCT/ES2015/070489

(51) Int. Cl.
*B60N 2/28*     (2006.01)
*B60N 2/015*    (2006.01)
*B60R 11/00*    (2006.01)

(52) U.S. Cl.
CPC ....... *B60N 2/2887* (2013.01); *B60N 2/01583* (2013.01); *B60N 2/289* (2013.01); *B60N 2/2893* (2013.01); *B60R 11/00* (2013.01); *B60R 2011/0012* (2013.01)

(58) Field of Classification Search
CPC .......... B60R 2011/0012; B60N 2/2887; B60N 2/289; B60N 2/2893
See application file for complete search history.

(56) References Cited

U.S. PATENT DOCUMENTS

| | | | |
|---|---|---|---|
| 2006/0103199 A1* | 5/2006 | Schleif ................ | B60N 2/2887 297/250.1 |
| 2006/0103515 A1* | 5/2006 | Schleif ................ | B60N 2/2887 340/438 |
| 2012/0241584 A1* | 9/2012 | McLeod .............. | B60N 2/2887 248/503.1 |

FOREIGN PATENT DOCUMENTS

| | | | | |
|---|---|---|---|---|
| DE | 19847650 A1 | 4/2000 | | |
| DE | 102010000780 A1 * | 7/2011 | .......... | B60N 2/2866 |
| DE | 202015100327 U1 * | 4/2016 | .......... | B60N 2/2824 |
| EP | 2957455 A1 * | 12/2015 | .......... | B60N 2/2887 |
| FR | 2917021 A1 | 12/2008 | | |

(Continued)

*Primary Examiner* — Timothy J Brindley
(74) *Attorney, Agent, or Firm* — Hayes Soloway P.C.

(57) ABSTRACT

Various solutions to make use of the lateral space of the rear seats in a vehicle. A first embodiment comprises a side module with: a first main body, in a longitudinal direction; first fixing means solidly joined to the first main body, so as to fix it to vehicle rings fixed to the vehicle; and a first adapter, which in turn comprises: a first adapter body, oriented in the longitudinal direction, and linked to the first main body, relative to which it is longitudinally movable; second fixing means, solidly joined to the first adapter body, for being fixed to object anchors mounted on the object; and first regulation means for enabling a selective fixation of the first adapter body in a desired position relative to the first main body in the longitudinal direction.

17 Claims, 13 Drawing Sheets

(56) References Cited

FOREIGN PATENT DOCUMENTS

| GB | 2424921 A | | 10/2006 | | |
|---|---|---|---|---|---|
| JP | 2013023032 A | * | 2/2013 | ........... | B60N 2/2821 |
| SE | 9802437 | | 7/1999 | | |
| WO | WO-2012172001 A1 | * | 12/2012 | ........... | B60N 2/2821 |
| WO | WO-2015151181 A1 | * | 10/2015 | ........... | B60N 2/2821 |
| WO | WO-2016066802 A1 | * | 5/2016 | ........... | B60N 2/2887 |
| WO | WO-2017186785 A1 | * | 11/2017 | ........... | B60N 2/2887 |

* cited by examiner

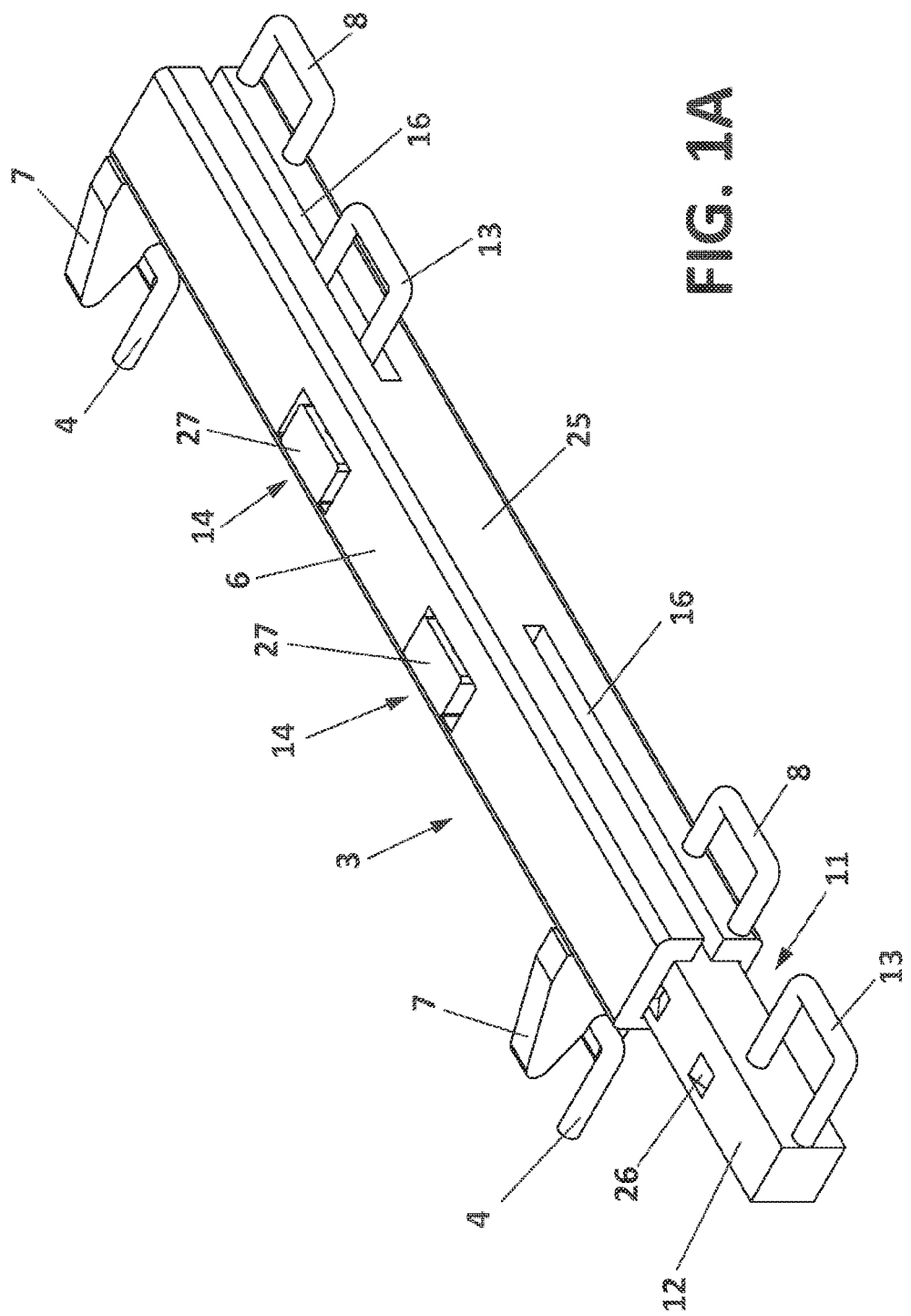

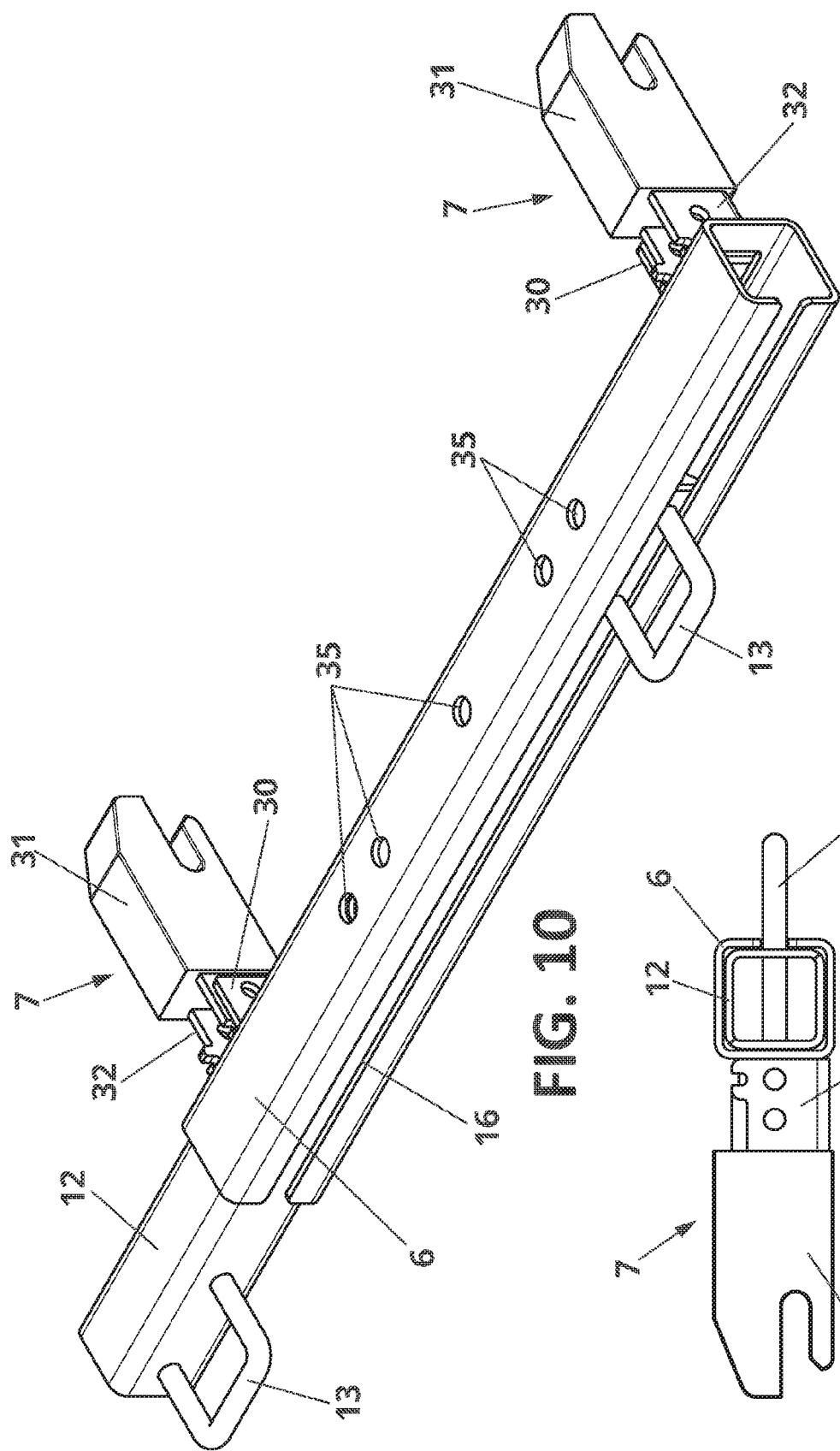

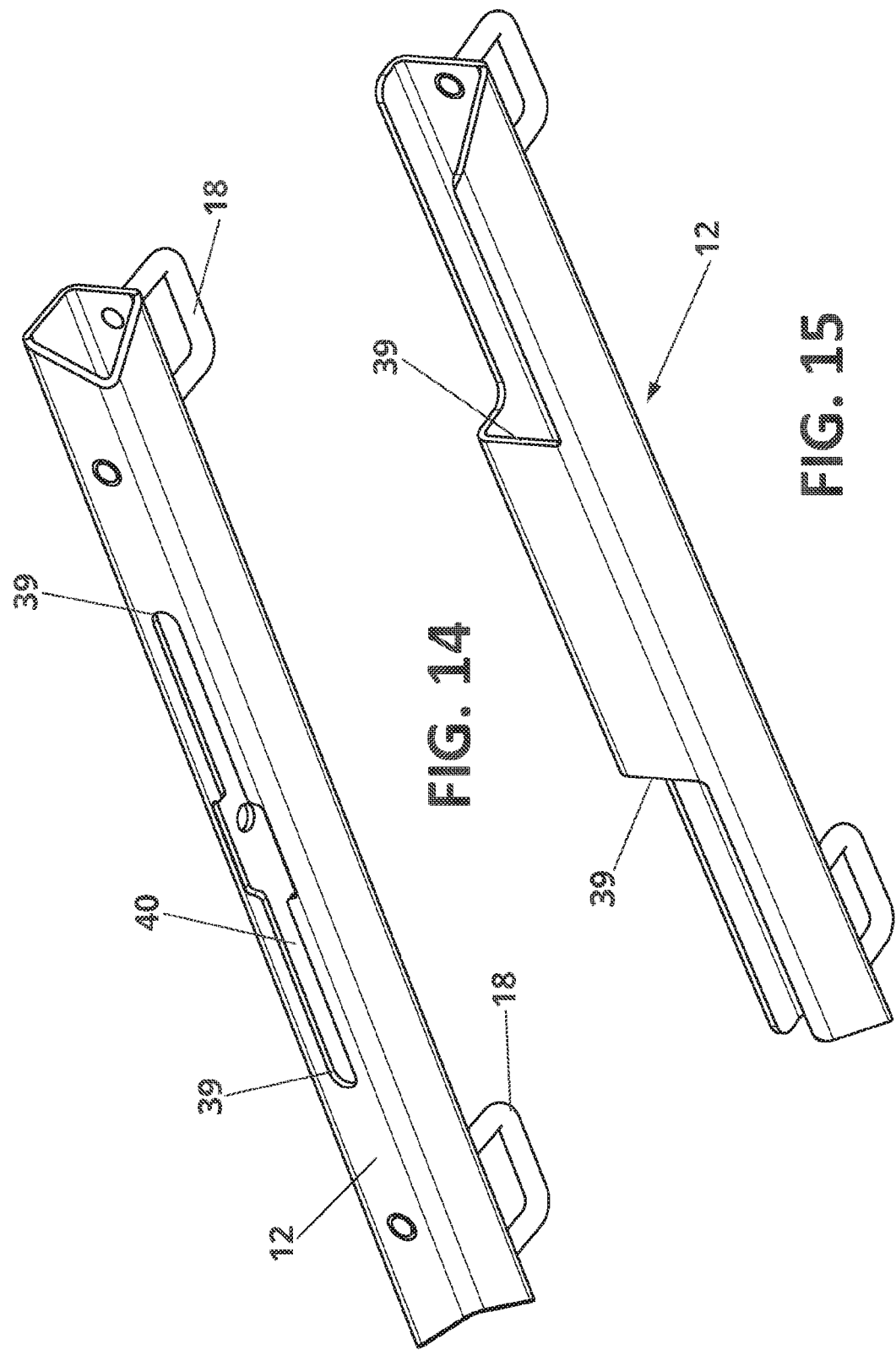

SECURING DEVICE FOR SECURING OBJECTS IN A VEHICLE

OBJECT OF THE INVENTION

The present invention can be included within the field of the art related to safety in the transportation of children in vehicles.

More particularly, the object of the invention relates to a device for fixing various types of objects in a vehicle, in particular child restraint systems, such as child car seats, which has improvements that make it possible a more compact manufacture, thus saving in the number of components and in manufacturing costs.

BACKGROUND OF THE INVENTION

Currently, there are standards to be applied on the safe transportation of children in vehicles. Particularly, in Europe the following standards ECE R44 and ECE R129 (i-size) must be applied, which correspond, although not completely, to homologous standards LATCH (which stands for "Lower Anchors and Tethers for Children") In US, as well as UAS ("Universal Anchorage System") and Canfixin, in Canada.

In all of them, there is prescribed the use of a system, known as ISOFIX system (ISOFIX is an ISO standard (ISO 13216) of fastening systems for safety chairs for children), or other equivalent names, depending on various particularities to which the Standard is applicable, for fixing child restraint systems, such as child chairs, on the rear seats of a vehicle. The ISOFIX system comprises, for each seat on which is arranged, two rings hooked on the rear seats and, therefore, fixed to the structure of the rear seats or to the chassis of the vehicle. Furthermore, the child restraint systems compatible with the ISOFIX system comprise two ISOFIX attachments, each of which is hooked in its corresponding ring of the ISOFIX system.

Given that the ISOFIX rings are fixed to the vehicle, either to the chassis or to the seats thereof, they do not make it possible to laterally regulate the children restraint systems fixed to said rings, which implies a inefficient use of the space inside the vehicle, thereby preventing the space of the central area of the rear seats from being used, for example, to receive a passenger, a package or even another child restraint system.

DESCRIPTION OF THE INVENTION

The present invention solves the aforementioned disadvantage, through a plurality of solutions to the common problem of improving the use of the space in the rear seats of a vehicle, in particular, but not exclusively, in the case of using child restraint systems.

According to a first object, the invention is based on a side module for fixing objects in a vehicle, the side module comprising:
 a first main body, which defines a longitudinal direction; and
 first fixing means solidly joined to the first main body, intended to fix the first main body to rings of the vehicle mounted on the side rear seats or on the chassis of a vehicle; and
 a first adapter, which in turn comprises:
  a first adapter body, longitudinal in nature, oriented along the longitudinal direction, which is linked to the first main body, relative to which it is longitudinally movable;
  second fixing means, solidly joined to the first adapter body, intended to be fixed to object anchors mounted on the object; and
  first regulation means for enabling a selective fixation of the first adapter body in a desired position relative to the first main body along the longitudinal direction.

According to a variant, the first adapter is replaced by fixing means, which are fixed to the first main body, and spaced apart towards the outside of the vehicle in the longitudinal direction, from the first fixing means by a predetermined distance, to be fixed to the object in a position closest to the side end of the vehicle than the position occupied by the first fixing means.

According to another aspect, the invention is based on a central module, which comprises:
 a second main body, oriented along the longitudinal direction;
 two fourth fixing means, solidly joined to the second main body, for anchoring an object to the second main body;
 a second adapter, which comprises two second adapter bodies linked to the second main body, and that are longitudinally movable relative to the second main body;
 fifth fixing means, respectively mounted on one outermost end, according to the longitudinal direction, of each one of the second adapter bodies, for fixing the central module inside the vehicle; and
 second regulation means, for enabling a selective fixation of the second adapter bodies in a desired position relative to the second main body.

The described central module can be connected to any of the side modules described, in order to define fixing devices in which the side modules are connected to the adapter bodies of the central module.

DESCRIPTION OF THE DRAWINGS

In order to complement the description being made and with the aim of facilitating a better understanding of the invention characteristics, according to a preferred and practical exemplary embodiment thereof, a set of drawings is attached as an integral part of said description, in which by way of non-limiting example, the following has been represented:

FIG. 1A.—Shows a perspective view of a side module comprised in the fixing device of the present invention, according to a first preferred embodiment.

In FIG. 4 a central module has been represented, which differs from the one represented in FIGS. 2 and 3, in that it incorporates second regulation bodies that are not articulated.

FIG. 10.—Shows a perspective view of another additional embodiment of the side module.

FIG. 11.—Shows a side view of the embodiment shown in FIG. 10.

FIG. 14.—Shows a perspective view of an exemplary embodiment of the first adapter body.

FIG. 15.—Shows a perspective view of another exemplary embodiment of the first adapter body.

PREFERRED EMBODIMENT OF THE INVENTION

Figure 1B:
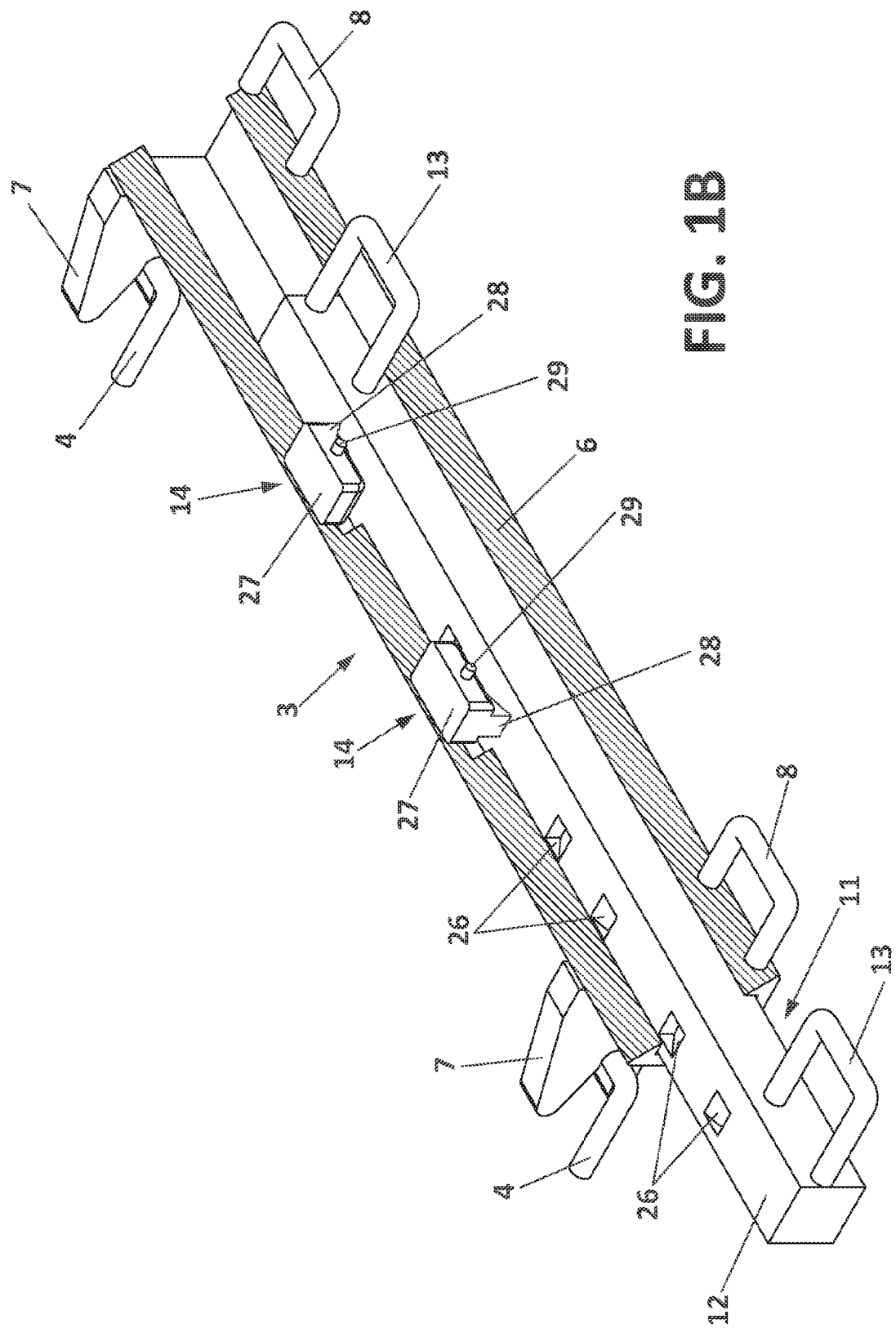
FIG. 1B.—Shows a partially cross-sectional view of the side module of FIG. 1A.

Below, there is a detailed description along with the aforementioned attached FIGS. 1-17, of four preferred exemplary embodiments of a fixing device for fixing objects, particularly child restraint systems (2), such as child chairs, in a vehicle (not represented), that constitute alternative solutions to the common problem of achieving the best use of the lateral space in vehicles.

The fixing device according to the present invention comprises at least one side module (3), to facilitate a safe fastening, with an improved use of the lateral space, of a child restraint device (2), such as, for example, a child car seat, to vehicle rings (4) fixed in the side rear seats (5) of a vehicle, either to the seats or to the chassis, the vehicle rings (4) being rings of the ISOFIX type.

According to a first embodiment, shown in FIGS. 1A and 1B, the fixing device comprises just one side module (3). In another preferred embodiment, shown in FIGS. 4 and 5, and that will be detailed below, the fixing device comprises two side modules (3), each one of which enables the anchoring of a corresponding child car seat (2) on each one of the side rear seats (5), either right or left, of the vehicle.

The next paragraphs describe in detail the first embodiment, mentioned above, which corresponds to a fixing device that incorporates one single side module (3).

The single side module (3) represented in FIGS. 1A and 1B, is intended to fix a child restraint system (2) in the side rear seat (5) behind the front passenger seat. Said side module (3) comprises, as can be appreciated in the aforementioned FIGS. 1A and 1B, a first main body (6) longitudinal in nature, which thereby defines a longitudinal direction, as well as first fixing means (7) within the ISOFIX standard ISO 13216 that, are preferably fixed on the rear, lower or upper part, to the first main body (6) or integrated in said first main body (6) to fix the first main body (6) to the vehicle rings (4). The first fixing means (7) are not movable relative to the first main body (6) and are located in accordance with the constraints of the ISOFIX standard, preferably in the vicinity of the ends of said first main body (6); they are also spaced apart by a distance that is in correspondence with the standard separation for the vehicle rings (4). In FIGS. 1A and 1B, the first fixing means (7) have been represented in the form of ISOFIX attachments.

An additional arrangement of a first adapter (11) has been provided to enable the fixation of a child restraint system (2) in different positions, to make a more efficient use of the available lateral space, as it will be explained below.

The first adapter (11) in turn comprises a first adapter body (12), longitudinal in nature, which is linked to the first main body (6), relative to which it is longitudinally movable. At the ends, or near the ends, of the first adapter body (12), there are corresponding second fixing means (13), which are fixed to the first adapter body (12), or form integral part of said first adapter body (12), and spaced apart by a distance corresponding to that of object anchors (9), to be fixed to an object, for example, a child restraint system (2). In FIGS. 1A, 1B, 4 and 5 the second fixing means (13) have been represented in the form of ISOFIX rings. Additionally, first regulation means (14) for enabling a selective fixation of the first adapter body (12) in a desired position relative to the first main body (6) have been arranged.

The first regulation means (14) preferably comprise:
a plurality of gaps (26) made in the first adapter body (12) in alignment with the respective desired positions; and
first locking means (27), provided with protrusions (28), and located on the first adapter body (12) in a movable manner between a blocked position, in which the protrusions (28) are locked into the gaps (26) so as to block the movement of the first adapter body (12), and a release position, in which the protrusions (28) are not locked into the gaps (26), thereby enabling the movement of the first adapter body (12). In the example represented in FIGS. 1A and 1B, two first locking means (27) which are movable in a pivoting manner relative to respective pivots (29), are arranged.

The side module (3) may further include, preferably at the front part of the first main body (6), third fixing means (8), to fix the first main body (6) to the object anchors (9) located in the child restraint system (2) or to anchor, as shown further below, a central module (17). In FIGS. 1A, 1B, 4 and 5 the second fixing means (8) have been represented in the form of ISOFIX rings. The third fixing means (8) are fixed to, or integrated in, the first main body (6), therefore they are nor movable relative to said first main body (6), being spaced apart by a distance that is in correspondence with the separation of the object anchors (9) arranged in the child restraint system (2). The side module (3) incorporates, as represented in the figures, two third fixing means (8) although it could incorporate just one single fixing means (8), or none.

Through the longitudinal movement of the first adapter body (12), the movement of the second fixing means (13) is achieved, in order to fix the child car seat (2) closer or farther, at will, relative to the side door of the vehicle, corresponding to the side where the side module (3) is mounted, using the lateral space in a more optimal manner, and therefore having more space available in the central part to locate comfortably a person or a package, or, as it will be explained further below, with reference to the aforementioned second embodiment, to fix a child restraint system (2) on a central rear seat (15) of the vehicle.

In the embodiment represented in FIG. 1A, it can be appreciated that the side module (3) represented, can be used both in the right side of the vehicle and in the left side, given that the first main body (6) further comprises, preferably at the front part thereof, at least one longitudinal slot (16), in which the first adapter body (12) is movably housed, moreover the slot or slots (16) enable the second fixing means (13) to protrude at least partially from said slot (16). A less preferred example comprises one single slot (16) that runs, in the longitudinal direction, from one end to another of the first main body (6). However, more preferably, in said FIG. 1A the arrangement of two slots (16), has been represented, slots that preferably are collinear, and spaced apart by an abutment (25).

On the other hand, the arrangement of dampening means (not represented) is provided to damper the movement of the first regulation body (12) relative to the first main body (6), in particular in the case of a lateral collision. As dampening means, by way of illustrative example, any one of the known means may be used, such as springs, air dampers, etc.

As indicated previously, the first embodiment of the present invention provides that the fixing device incorporates one single side module (3) as the one described in previous paragraphs with the help of FIGS. 1A and 1B, said side module (3) being mounted on any one of the side rear seats (5) of the vehicle, or on both side rear seats (5).

According to a second embodiment of the invention, as it can be appreciated in FIGS. 2-5, there is described a fixing device that comprises a central module (17), as detailed below.

Figure 2:
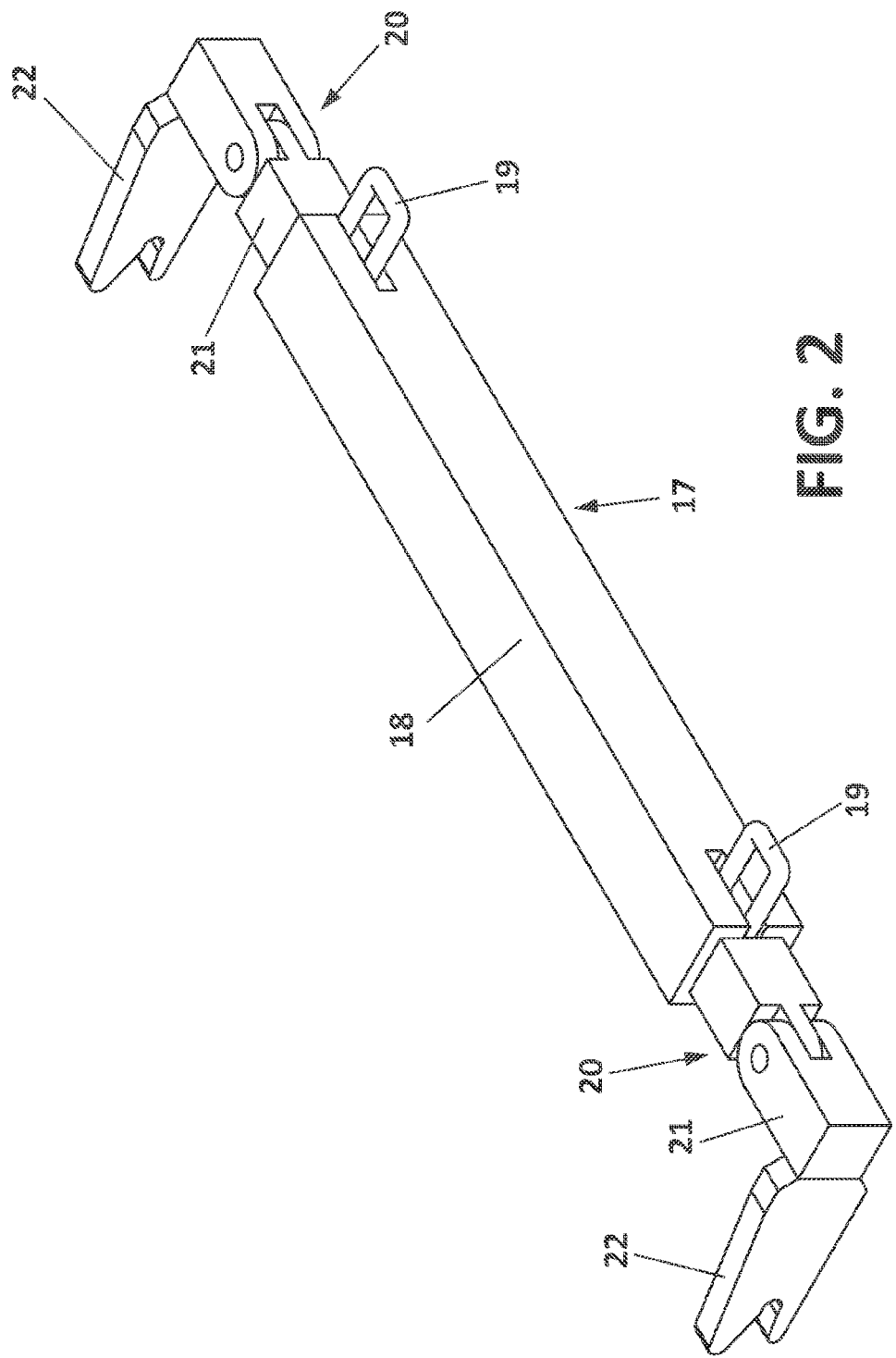
FIG. 2.—Shows a perspective view of a central module comprised in a second preferred embodiment of the fixing device of the present invention.

The central module (17) comprises a second main body (18), of longitudinal configuration, as well as two fourth fixing means (19), to anchor the child restraint system (2) to the second main body (18). The fourth fixing means (19) are fixed to the second main body (18), or form integral part with said second main body (18); moreover, the fourth fixing means (19) are spaced apart by a distance that is in correspondence with the separation of the object anchors (9). In FIG. 2, fourth fixing means (19), in the form of ISOFIX rings, have been represented.

It is provided that the central module (17) further incorporates a second adapter (20), which comprises two second adapter bodies (21) linked to the second main body (18), the second adapter bodies (21) being longitudinally movable relative to the second main body (18).

According to a preferred example, the second adapter bodies (21) are housed in the second main body (18), even more preferably, by means of a form-fit lock, for example, as represented in FIG. 2, both the second main body (18) and the second adapter bodies (21) are configured with corresponding polygonal sections, for example, quadrangular. Alternatively, without a form-fit lock, they may be configured as machined hollow or solid cylindrical bars.

Figure 3:
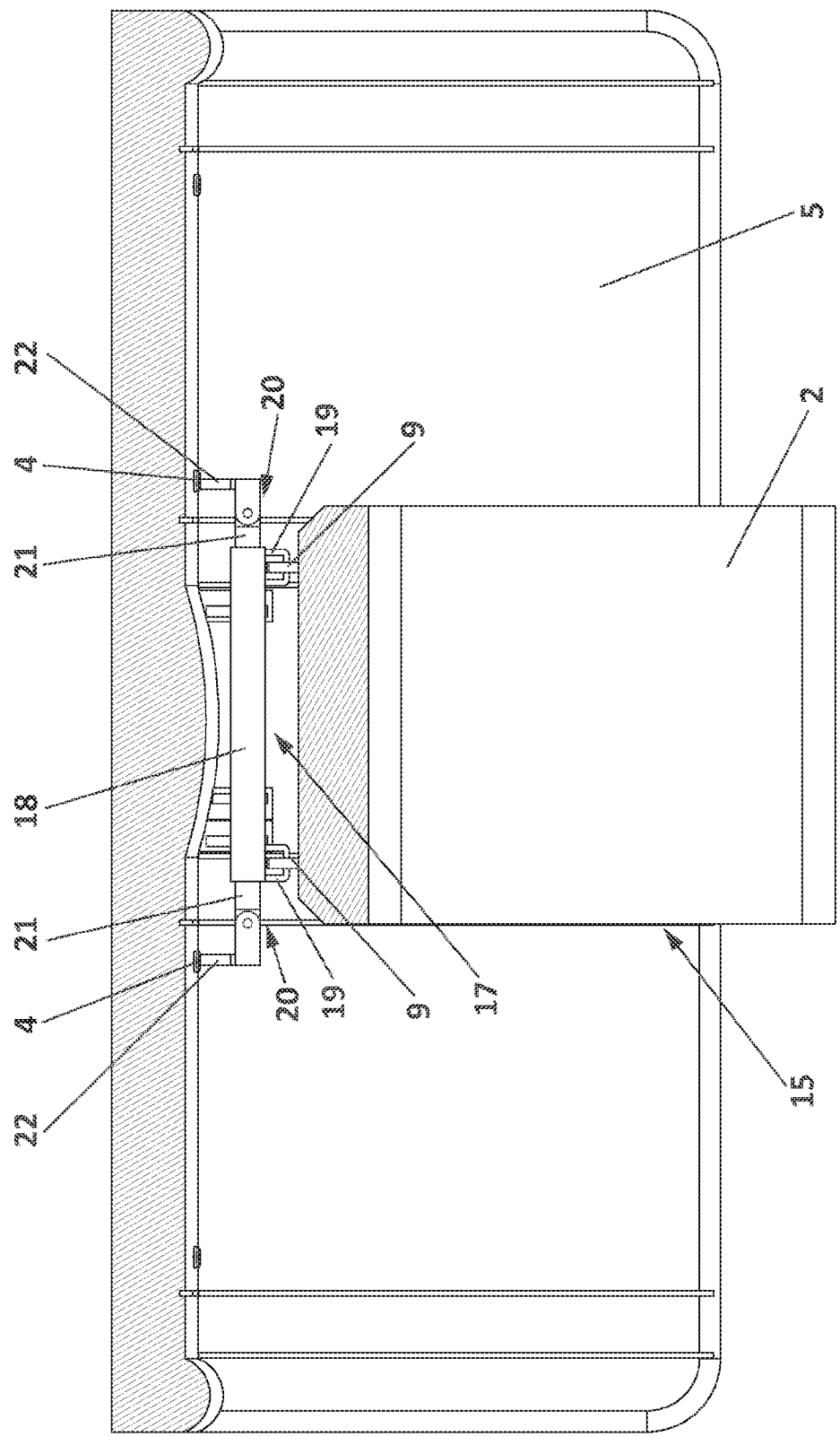
FIG. 3.—Shows a cross-sectional top view of the central module of FIG. 2 mounted on the central rear seat of a vehicle.
Figure 4:
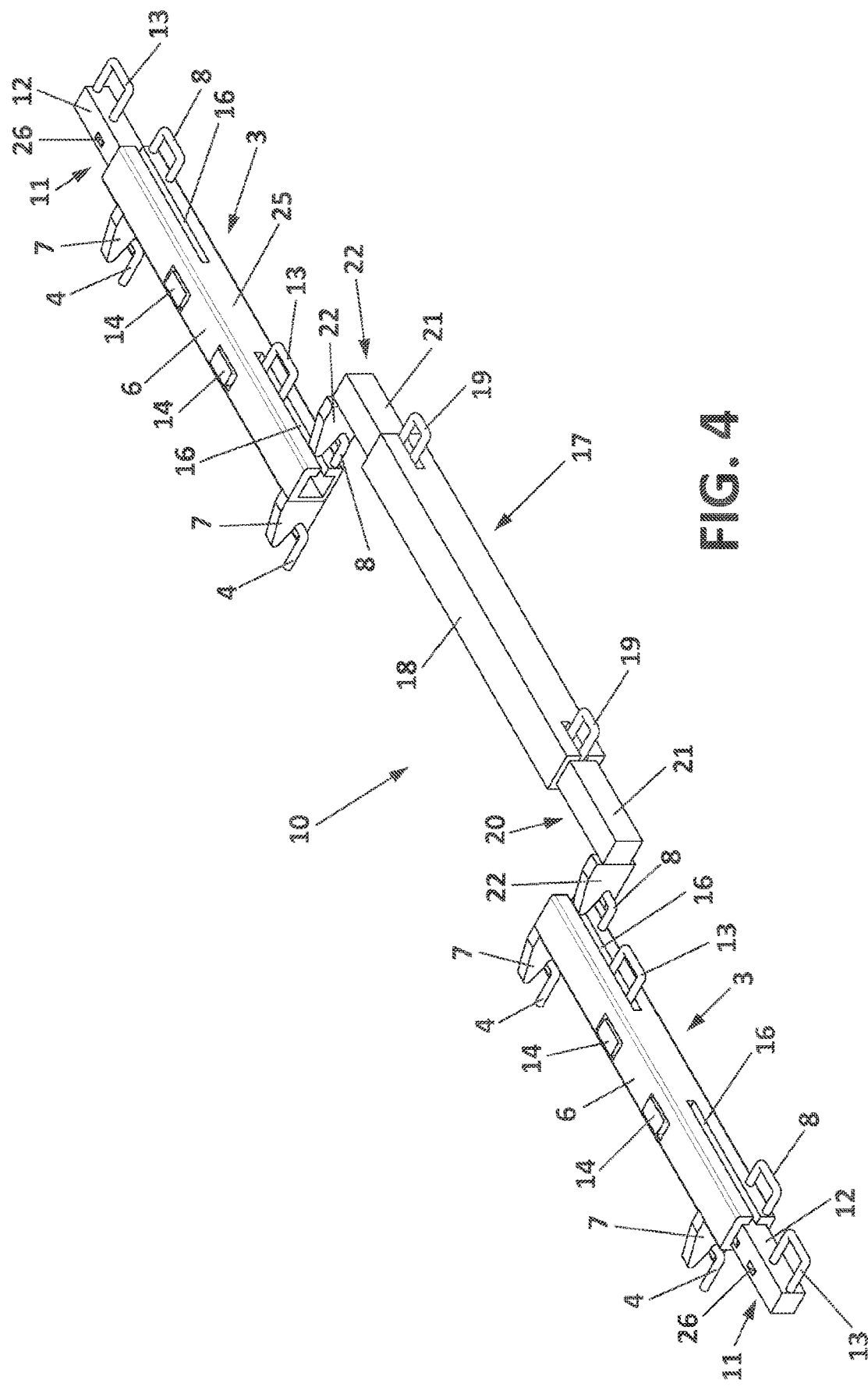
FIG. 4.—Shows a perspective view of a preferred embodiment of the fixing device that comprises a central module similar to that of FIGS. 2 and 3, and two lateral modules, such as those of FIGS. 1A and 1B, positioned on both sides of the central module.

On one end of each one of the second adapter bodies (21), which is outermost according to the longitudinal direction, respective fifth fixing means (22) are mounted, preferably, on the rear part, lower part or on the upper part, preferably of the ISOFIX attachments, to connect the central module (17), either with the innermost third fixing means (8), in the longitudinal direction, of each one of the central modules (3), as shown in FIG. 4, or with corresponding vehicle rings (4), as can be appreciated in FIG. 3.

The central module (17) further comprises second regulation means (not represented), to enable a selective fixation of the second adapter bodies (21) in a desired position relative to the second main body (6). The second regulation means may preferably, be configured in an analogous manner to the first regulation means (14).

Preferably, as can be observed in FIGS. 2-5, the second adapter bodies (21) comprise an inner portion housed inside the second main body (18) and an outer portion protruding from said second main body (18).

Moreover, preferably, the second adapter bodies (21) may comprise at least two articulated segments, as shown in FIG. 2.

Through the incorporation of the central module (17), it is possible to fix a child restraint system (2) on a central seat (15) of the vehicle at a variable position, given that the longitudinal movement of the second adapter bodies (21) makes it possible to fix the second main body (18) to each one of the central modules (2), or the vehicle rings (4), regardless of the position in which said central modules (2) or said vehicle rings (4) are along the longitudinal direction.

Figure 5:
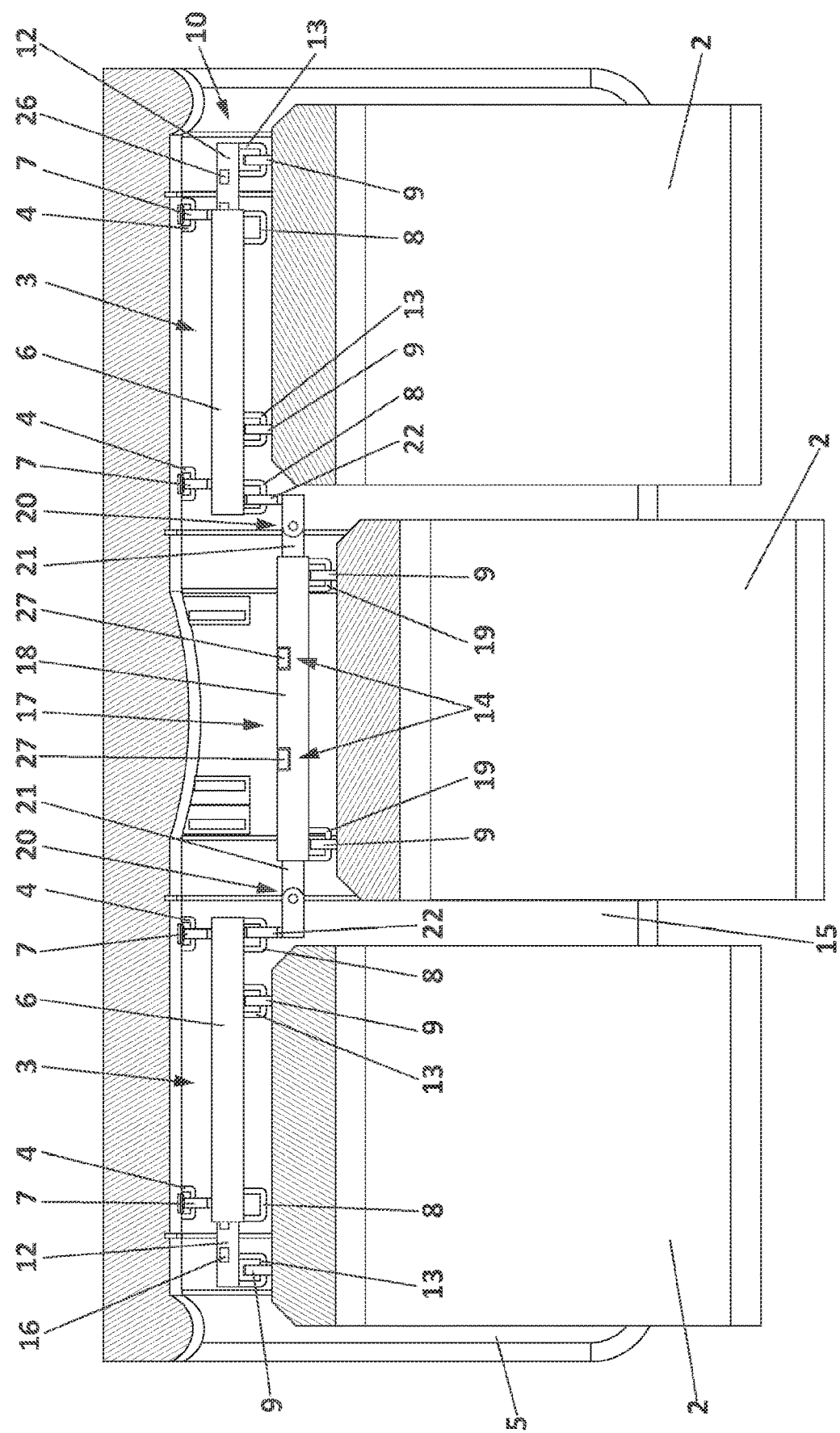
FIG. 5.—Shows a cross-sectional perspective view of the fixing device similar to that of FIG. 4, mounted in a vehicle and with child car seats coupled on the side rear seats and on the central rear seat, wherein the central module corresponds to the central module with the second articulated regulation bodies, represented in FIGS. 2 and 3.

In the embodiments shown in FIGS. 2 and 3, there is described a fixing device that only comprises the central module (17), however, alternatively, according to a third embodiment of the present invention, as will be described below with the help of FIGS. 4 and 5, the fixing device incorporates at least one, preferably two, central modules (3), each one of them intended to be mounted on their corresponding side rear seat (5), in addition the fixing device further incorporates the central module (17), described above, connected to each one of the central modules (3).

In light of FIG. 6, below there is described, according to a fourth embodiment of the present invention, also aimed at solving the technical problem of providing an improved use of the lateral space of the rear seats in a vehicle, a fixing device that comprises an alternative side module (3), which in addition to the first main body (6) and the first fixing means (7) shown in FIGS. 1A and 1B, incorporates sixth fixing means (24), preferably of the ISOFIX ring type, which are fixed to the first main body (6), and spaced apart, towards the outside of the vehicle in the longitudinal direction, from the first fixing means (7), by a predetermined distance, for example, of 3 cm, 5 cm or 7 cm, to be fixed to a child restraint system (2) in a position closest to the lateral end of the vehicle, than the position occupied by the first fixing means (7). The fourth embodiment is an alternative, with respect to the first embodiment, to the use of the first adapter (11).

Figure 6:
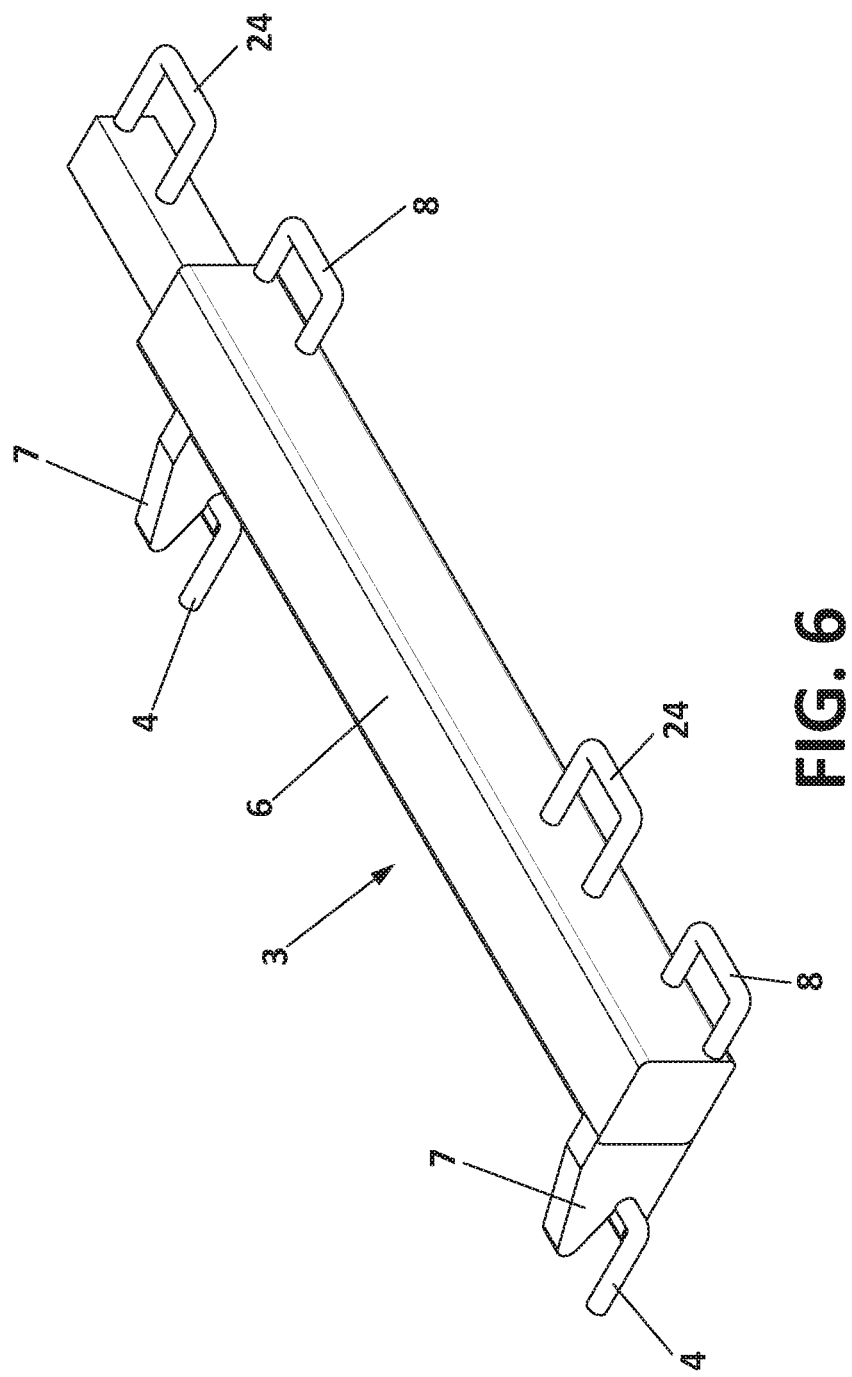
FIG. 6.—Shows a perspective view of an alternative side module to the one represented in FIGS. 1A and 1B.

The side module (3) represented in FIGS. 1A and 1B, as well as the side module (3) of FIG. 6, may incorporate the aforementioned third fixing means (8). In said figures, there have been represented embodiments that incorporate a number of two third fixing means (8), but alternatively they may just incorporate one single third fixing means (8) or none at all.

The side module (3) of the third embodiment is compatible with the central module (17), to achieve a device such as the one of the third embodiment.

Preferably, the first fixing means (7) and the fifth fixing means (22) have an extensible configuration, to provide an adjustable distance between, on the one hand, the vehicle rings (4) or the third fixing means (8) and, on the other hand, the first main body (6) or the second main body (18).

In the case when they are intended to fix objects other than a child restraint system, the vehicle rings (4) may be arranged in various positions on the rear part of a vehicle, not necessarily in accordance with the constraints of the ISOFIX standard and similar.

The first main body (6) and the second main body (18) are preferably shaped as a bar, either prismatic or cylindrical, as shown in the figures, for the prismatic case.

Moreover, the central modules (3) and the central module (17) described can be manufactured with multiple materials, preferably metallic, although polymers, glass or carbon fibers may also be used, etc.

Next, various additional preferred embodiments are described, which are compatible with the embodiments described above, and cooperate to provide a better compactness to the invention, such that the object of the invention takes less space, and in addition enables the number of components to be reduced, which results in a simplification and, therefore, in a cost reduction, in the manufacturing and the assembly thereof.

Particularly, the features that are described below enable to meet the requirements of the ECE-R16 standard. The implementation of the ECE-R16 standard is not mandatory for fixing devices such as the one that makes up the present invention, but for child restraint devices, i.e., child car seats. Among others, the stated standard relates to size requirements of the child car seats. However, with the features stated below, it is ensured that the device of the invention also meets the size constraints of ECE-R16 standard for child car seats.

Figure 9:
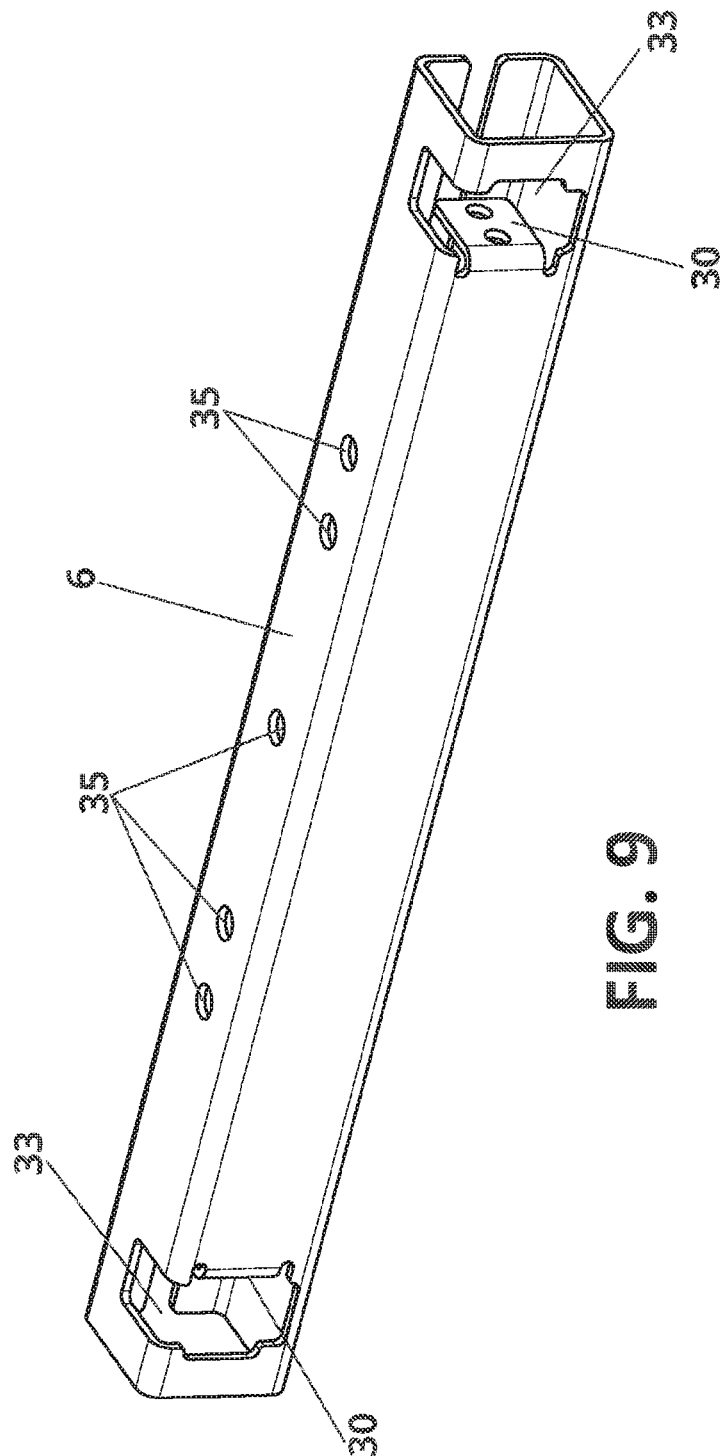
FIG. 9.—Shows a perspective view of the first main body of the embodiment of FIGS. 7 and 8.

One of the features, in accordance with FIGS. 9 and 10, relates to a particular example to fix the first fixing means (7) to the first main body (6), through joints (30) that are integrally formed with the first main body (6). In the represented examples, preferably, the joints (30) are flaps obtained by deep drawing. Said joints (30) prevent the incorporation of additional parts to connect the first fixing means (7) to the first main body (6), such that it suffices to use common means, such as rivets, welding, etc., to join the first fixing means (7) at the joints (30).

Another one of the features to be addressed, and that is compatible with the use of the joints (30) mentioned above, as shown in FIGS. 7-9 and 17, is the possibility to adapt the invention to the constructive features imposed by each vehicle manufacturer, even for each particular model, where the vehicle rings (4) can be in positions that are more forward or more rearward, relative to the travel direction.

To achieve the referred adaptation, the fixing means (7), typically ISOFIX attachments, intended to be anchored to the vehicle rings (4), can have a clamp portion (31), which is the one being hooked to the vehicle rings (4), and an anchoring portion (32), attached or integrally formed with the clamp portion (31), and designed to be fixed to the first main body (6).

The feature, to which reference is being made here, is defined as a hollow space (33, 34) for housing the clamp portion (31). The hollow space (33, 34) can be positioned in a frontmost part of the first main body (6) or on the first adapter body (12).

As indicated previously, the use of hollow spaces (33, 34) is compatible with that of the joints (30). Particularly, the joints (30), for example, the flaps, can be inwardly folded, see FIG. 9, or outwardly folded, see FIG. 10.

Figure 7:
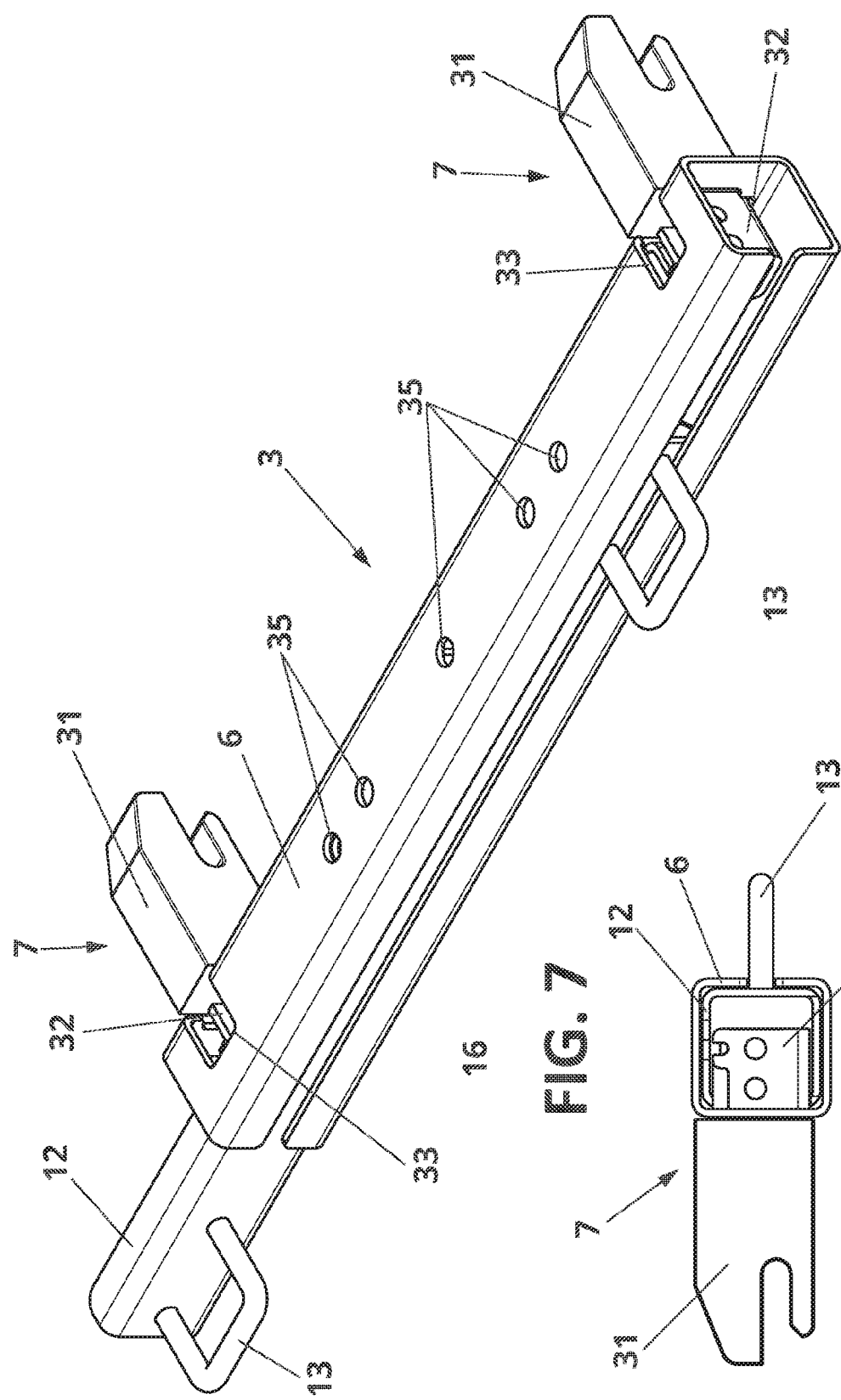
FIG. 7.—Shows a perspective view of an additional embodiment of the side module.
Figure 8:
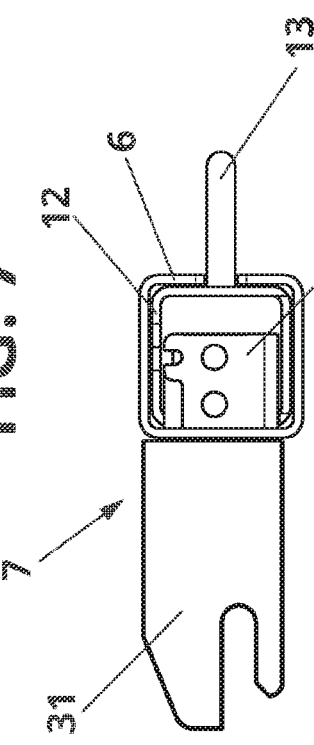
FIG. 8.—Shows a side view of the embodiment shown in FIG. 7.

In FIGS. 7-9, it can be observed that the hollow space (33, 34) is a first hollow space (33) configured as a mortise. As an alternative, in FIG. 17 a second hollow space (34) is shown, with an alternative embodiment that starts at the end of the first adapter body (12), preventing interferences in the travel thereof along the entire range.

In this way, when the vehicle rings (4) occupy a foremost position, the space can be used better using a first main body (6) or a first adapter body (12) provided with the hollow space (33, 34); in contrast, when the vehicle rings (4) occupy a rearmost position, and so as to not excessively invade the space intended for the car seat, preferably a configuration without the hollow space (33, 34), can be used in which the anchoring portion is fixed to a front face of the first main body (6).

Another significant feature, illustrated in FIGS. 7, 9, 10, 12, 13 and 16, relates to the first regulation means (14) and the second regulation means, and is also compatible with the previously expressed features. Specifically, for a particular case in which both the main bodies (6, 18), and their corresponding adapter bodies (12, 21) are hollow profiles, where the adapter bodies (12, 21) may move through the inside of the main bodies (6, 18), it is provided that the first and or the second regulation means (14) may incorporate a combination of:

a plurality of regulation bores (35), made in an upper area and/or in a lower area of the corresponding main body (6, 18); and second locking means, (36) housed inside the corresponding adapter body (12, 21), each one of them comprising in turn a locking body (37), and one or two locking protuberances (38), protruding from the locking body (37), and which can be housed in a protruding manner in the regulation bores (35), the second locking means (36) being manually activated so as to make it possible passing selectively from one blocked configuration in which the locking protrusion or protrusions (38) protrude from the regulation bores (35), and thereby prevent a relative movement between the main body (6, 18) and the adapter body (12, 21), to a non-blocked configuration, in which the locking protrusion or protrusions (38) do not protrude from the regulation bores (35), and thereby enable a relative movement between the main body (6, 18) and the adapter body (12, 21).

The locking protrusions (38) may be configured in various different manners; in particular, they can be: integrally configured with the locking body (37), either by deep-drawing, molding, etc; or fixed to the locking body (37), either detachably (through screws, etc.) or in a non detachable manner (welding, etc). Moreover, the locking protrusions (38) may also be movable relative to the locking body (37).

Preferably, the second locking means (36) are deformable so as to enable their switching between the blocked and the non-blocked configurations. According to a first preferred example, the locking body (37) is deformable, for example, see FIGS. 12, 13 and 16, and may be configured as a V-shaped strapping band, on one or in two of the ends of which the locking protrusions (38) are fixed. According to a second preferred example, not represented, as indicated previously, the locking protrusions (38) are movable in a resilient manner relative to the locking body (37) between a position corresponding to the blocked configuration and another one that corresponds to the non-blocked configuration.

In FIGS. 7, 9, 10, 12, 16 and 17 there are shown, by way of example, five regulation bores (35), located only on the upper part. The five regulation bores (35) comprise a central bore and two pairs of end bores. The end bores enable the second fixing means (13) to be fixed at predetermined distances from the corresponding sides of the vehicle, for example, at 50 and 70 mm.

Another feature that should be emphasized, as illustrated in FIGS. 14 and 15, relates to the possibility of limiting the relative movement of the main bodies (6, 18) and their corresponding adapter bodies (12, 21), between two end positions, also for the aforementioned case in which both the main bodies (6, 18), and their adapter bodies (12, 21) are hollow profiles, and moreover the adapter bodies (12, 21)

can move through the inside of the main bodies (6, 18). The present invention proposes, for such purpose, arranging one or several abutments linked to the main bodies (6, 18) or to the adapter bodies (12, 21), to abut respectively against its corresponding adapter body (12, 21) or main body (6, 18).

By way of first example, in the particular case of using inwardly folded flaps as joints (30), which is preferably also more compatible with the use of mortises, the flaps themselves serve as abutments.

By way of second example, which is most preferred when mortises are not used, although it can also be used along with mortises, the main bodies (6, 18) may incorporate one or more protuberances (not shown) that protrude from the inside, to abut against abutment walls (39) defined in the corresponding adapter bodies (12, 21). According to a first embodiment of the second example, see FIG. 14, the abutment walls (39) are internally defined at the ends of a gap (40) provided in the adapter bodies (12, 21), wherein the main bodies (6, 18) only comprise one protuberance running inside the gap (40). According to a second embodiment of the second example, see FIG. 15, the main bodies (6, 18) comprise two protuberances, each one of which abuts against a corresponding abutment wall (39) defined in an outer contour of a solid segment of the adapter bodies (12, 21).

The examples described make it possible supplying assemblies in which the adapter body (12, 21) is mounted in its corresponding main body (6, 18) in a not detachable manner.

Figure 12:
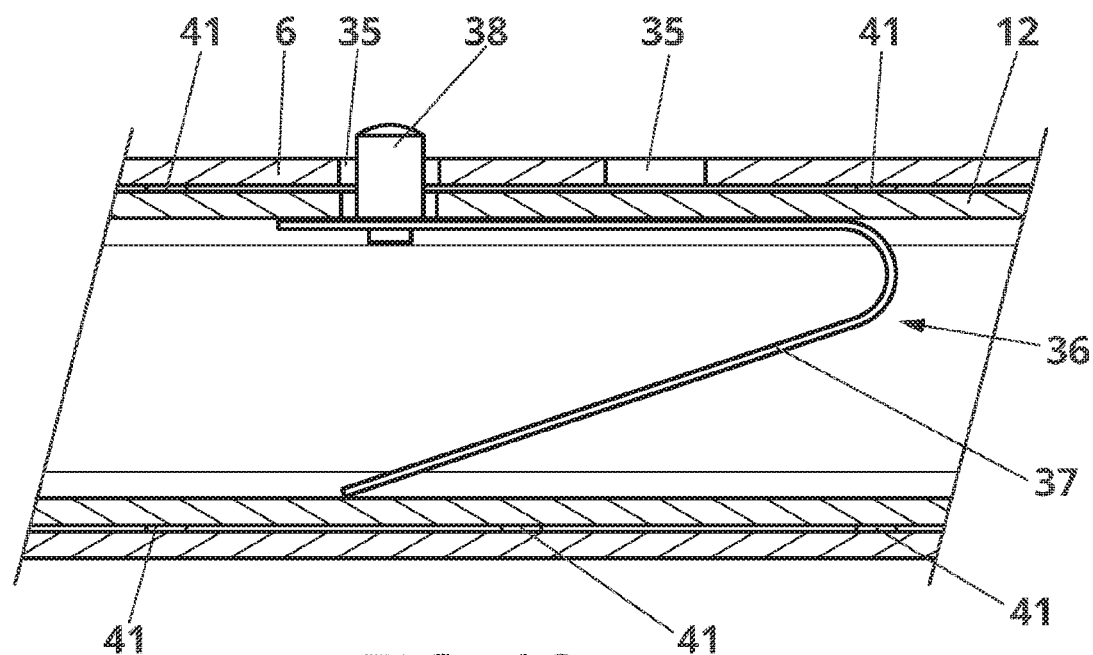
FIG. 12.—Shows a schematic view of an embodiment of the regulation means.
Figure 13:
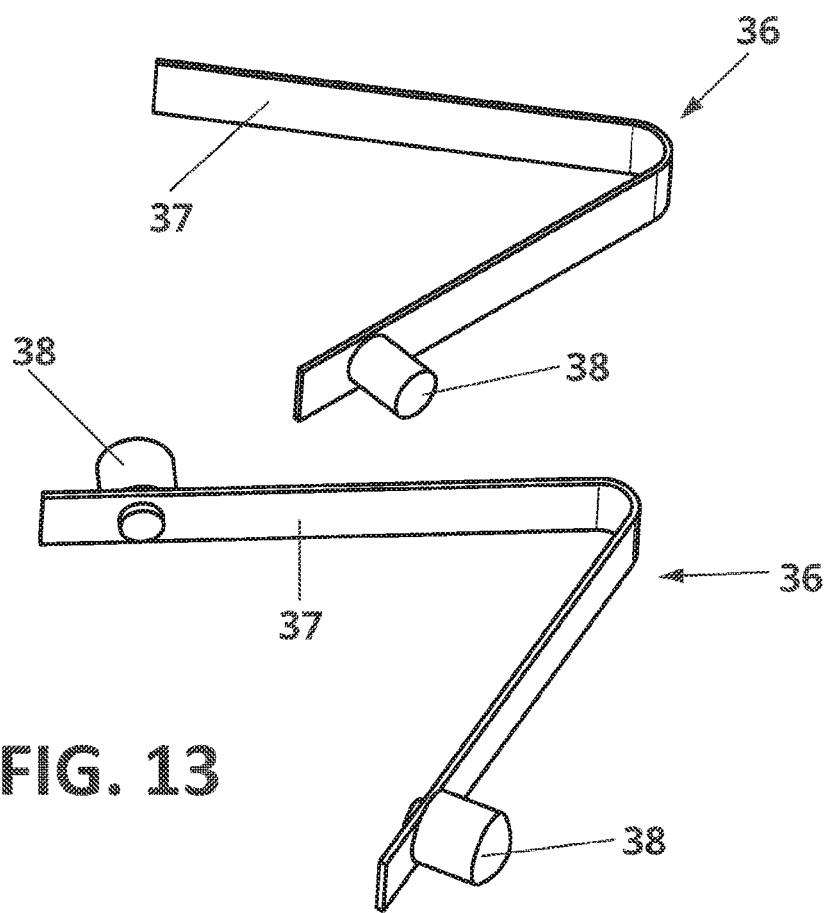
FIG. 13.—Shows a detailed view of two examples of the regulation means depicted in FIG. 12.
Figure 16:
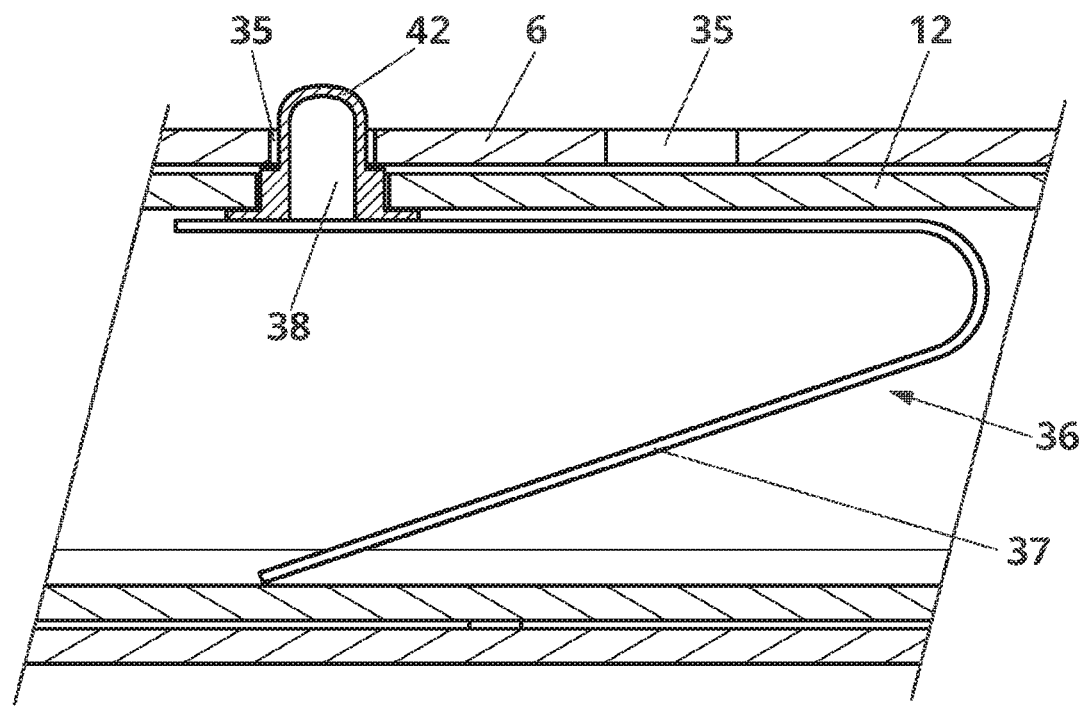
FIG. 16.—Shows a schematic view of an embodiment for reducing the noise associated to the relative movement between the main bodies and the adapter bodies.
Figure 17:
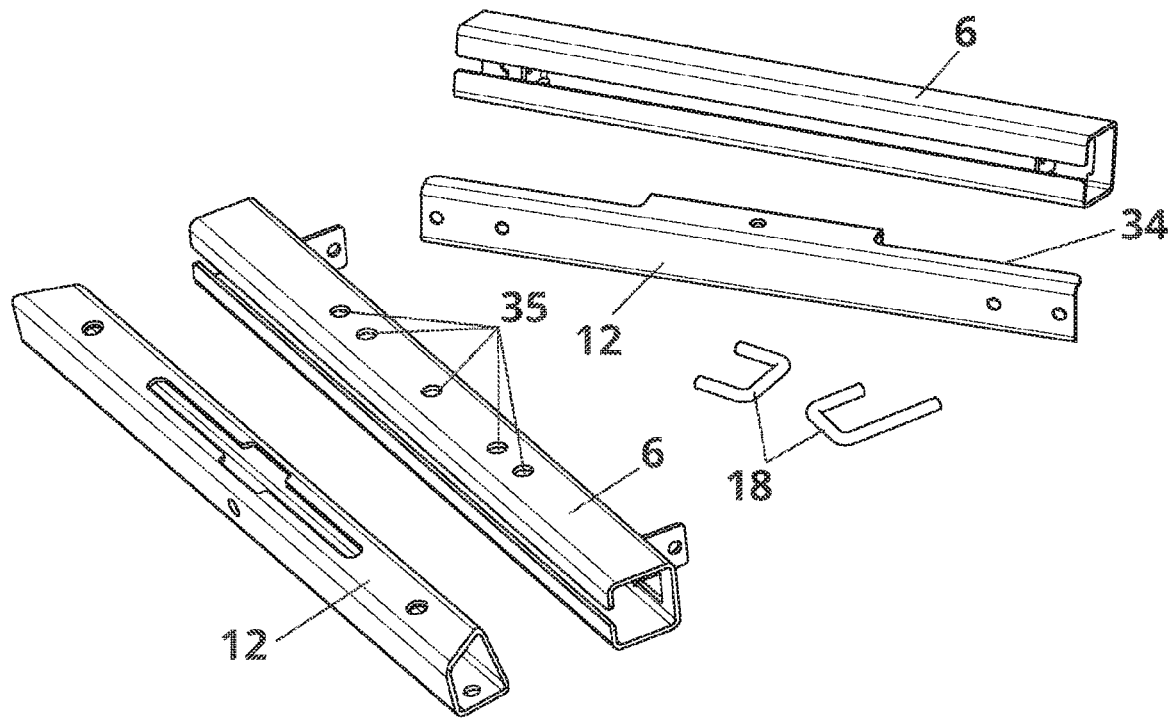
FIG. 17.—Shows perspective views of exemplary embodiments of the main bodies, adapter bodies and rings serving as fixing means.

Another feature that should be highlighted relates to, in accordance with FIGS. 12 and 16, the incorporation of vibration dampers (41, 42), to silence the relative movement between the adapter bodies (12, 21) and the main bodies (6, 18), also for the aforementioned case in which both the main bodies (6, 18), and their adapter bodies (12, 21) are hollow profiles, and moreover the adapter bodies (12, 21) movies movable through the inside of the main bodies (6, 18).

According to a first example, see FIG. 12, the dampers (41, 42) comprise first dampers (41) fixed in a protruding manner, either internally to the main bodies (6, 18), and/or externally to the adapter bodies (12, 21), to cause a contact between said dampers and the main bodies (6, 18) or the adapter bodies (12, 21), thus preventing a direct contact between the main bodies (6, 18) and the adapter bodies (12, 21), and therefore reducing the noise due to vibrations.

According to a second example, the dampers (41, 42) comprise second dampers (42) that cover the locking protrusions (38).

In a complementary manner to that explained previously for the third fixing means (8), and which is compatible with the embodiments described above, for example, in the case of ISOFIX rings, said third fixing means (8) may be present in a number of one, two or more, as well as, being alternatively fixed to, or integrated with, the first main body (6), or may be fixed in a detachable manner.

Preferably, and compatible with the rest of the described embodiments, finishing or decorative elements (not represented) are arranged so as to cover edges of visible or accessible elements, to improve aesthetics and/or prevent discomfort or damage to people and objects.

In a complementary manner to what has been explained above, for the sections of the second main bodies (18) and their corresponding second adapter bodies (21), it is described that, in general, the sections of both the first (6) and second (18) main bodies, as well as the first (12) and second (21) adapter bodies may adopt any constructively or functionally suitable shape, in particular, but not exclusively: quadrangular (square, rectangular, trapezoid, trapezoidal etc.), cylindric (circular, elliptic, etc.), polygonal in general (triangular, hexagonal, etc.), and/or combinations of any of the previous shapes.

The second (13), third (8) and fourth (19) fixing means may be designed in different shapes. For example, in the particular case of ISOFIX rings, they may have different shapes and sizes, depending on the needs. By way of particular example, see FIG. 17, they may be U-shaped with two branches having the same length or with one branch shorter than the other, depending on whether they are fixed onto the same face (front or rear face), or to two opposite faces of the main bodies (6, 18), or the adapter bodies (12, 21).

The invention claimed is:

1. A fixing device, for fixing objects in a vehicle, the fixing device comprising at least one side module, which in turn comprises:
a first main body, featuring a shape of a hollow bar defining a longitudinal direction; and
first fixing elements joined to the first main body, the first fixing elements being unmovable relative to the first main body, so as to fix the first main body to vehicle ISOFIX low anchorages mounted on side rear seats or on a chassis of the vehicle;
the fixing device further comprising a first adapter which in turn comprises:
a first adapter body, longitudinal in nature, featuring a shape of a bar oriented along the longitudinal direction, the first adapter body being displaceable inside the first main body along the longitudinal direction;
second fixing elements joined to the first adapter body, the second fixing elements being unmovable relative to the first adapter body and intended to be fixed to object anchors mounted on the object; and
first regulation elements for enabling a selective fixation of the first adapter body in a desired position relative to the first main body following the longitudinal direction
wherein the first main body further comprises at least one longitudinal slot configured so as to allow the second fixing elements to overhang outside said slot or slots.

2. The fixing device of claim 1, wherein the first fixing elements comprise ISOFIX attachments configured for being fixed to vehicle anchorages of the ISOFIX low anchorage type.

3. The fixing device of claim 1, wherein the at least one slot comprises two collinear slots which are spaced apart by an abutment.

4. The fixing device of claim 1, wherein the first regulation elements comprise:
a plurality of gaps made in the first adapter body in correspondence with the respective desired positions; and
first locking mechanism, provided with protrusions, and located on the first adapter body in a movable manner between a blocked position, in which the protrusions are locked into the gaps so as to block the movement of the first adapter body, and a release position, in which the protrusions are not locked into the gaps, for enabling the movement of the first adapter body.

5. The fixing device of claim 4, wherein the first regulation elements comprises two first locking mechanisms which are movable in a pivoting manner relative to respective pivots.

6. The fixing device of claim 1, further comprising a dampener for dampening a movement in the longitudinal direction of the first regulation body relative to the first main body.

7. A fixing device for fixing objects in a vehicle, the fixing device comprising a central module, which in turn comprises:
- a first main body, oriented along the longitudinal direction;
- two first fixing elements, joined to the first main body, the two first fixing elements being unmovable relative to the first main body, for anchoring an object to the first main body;
- a first adapter, which comprises two first adapter bodies, which are linked to the first main body, and which are longitudinally movable relative to the first main body;
- second fixing elements, respectively mounted on one outermost end, according to the longitudinal direction, of each one of the first adapter bodies, for fixing the central module inside the vehicle; and
- second first regulation element, to enable a selective fixation of the first adapter bodies in a desired position relative to the first main body.

8. The fixing device of claim 7, wherein the first main body features a shape of a hollow bar, wherein the first adapter features a shape of a bar which is displaceable inside the first main body along the longitudinal direction.

9. The fixing device of claim 7, wherein the first adapter bodies comprise an inner portion housed inside the first main body and an outer portion protruding from said first main body.

10. The fixing device of claim 7, wherein the first adapter bodies comprise at least two segments which are articulated to each other.

11. The fixing device of claim 1, further comprising joints for fixing the first fixing elements to the first main body, wherein the joints are formed integrally with the first main body.

12. The fixing device of claim 1, wherein the fixing elements comprise:
- a clamp portion, for being hooked to the vehicle ISOFIX low anchorages, and
- an anchoring portion, attached or integrally formed with the clamp portion, and configured to be fixed to the first main body, wherein the first main body and/or the first adapter body comprise on the front part thereof a hollow space to house the clamp portion.

13. The fixing device of claim 12, wherein the hollow space is a first hollow space configured as a mortise in the first main body.

14. The fixing device of claim 12, wherein the hollow space is a second hollow space that starts at the end of the first adapter body.

15. The fixing device of claim 1, wherein the first regulation elements comprises:
- a plurality of regulation bores, made in an upper area and/or in a lower area of the corresponding main body; and
- second locking mechanism, housed inside the corresponding adapter body, and each one of them comprising in turn a locking body, and one or two locking protuberances, protruding from the locking body, and which can be housed in a protruding manner in the regulation bores, the second locking mechanism being manually activated so as to enable them to selectively pass from one blocked configuration in which the locking protrusion or protrusions protrude from the regulation bores, and thereby prevent a relative movement between the main body and the adapter body, to a non-blocked configuration, in which the locking protrusion or protrusions do not protrude from the regulation bores, and thereby enable a relative movement between the main body and the adapter body.

16. The fixing device of claim 1, further comprising one or more abutments linked to the first main body or to the first adapter body, so as to abut against its corresponding first adapter body or first main body in order to limit the relative movement of the first main body and the first adapter body, between two end positions.

17. The fixing device of claim 16, further comprising joints for fixing the first fixing elements to the first main body, the joints being formed integrally with the first main body; as well as the joints comprise deep-drawn flaps protruding towards the inside or the outside of the first main body; wherein the flaps are inwardly folded, as well as the abutments are formed by the flaps themselves.

* * * * *

UNITED STATES PATENT AND TRADEMARK OFFICE
CERTIFICATE OF CORRECTION

PATENT NO. : 10,589,645 B2
APPLICATION NO. : 15/739018
DATED : March 17, 2020
INVENTOR(S) : Jose Lagunar Herranz Page 1 of 1

It is certified that error appears in the above-identified patent and that said Letters Patent is hereby corrected as shown below:

In the Claims

Column 11, Claim 7, Line 20, after "and", delete "second".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*